United States Patent [19]

Green

[11] Patent Number: 4,690,574
[45] Date of Patent: Sep. 1, 1987

[54] BEARING AND METHOD FOR ROTATABLY SUPPORTING A WORN SHAFT

[75] Inventor: Bernard Green, South Euclid, Ohio
[73] Assignee: The Green Ball Bearing Company, Cleveland, Ohio
[21] Appl. No.: 931,614
[22] Filed: Nov. 17, 1986
[51] Int. Cl.[4] .................................. F16C 25/06
[52] U.S. Cl. .................................. 384/569; 384/548; 384/624
[58] Field of Search ............... 384/569, 624, 445, 484, 384/559, 548

[56] References Cited

U.S. PATENT DOCUMENTS 2,994,566  8/1961  Keller .................................. 384/624
3,231,317  1/1966  Dudar .................................. 384/624
3,977,741  8/1976  Lundberg .............................. 384/569
4,183,589  1/1980  Heenan ................................. 384/624

Primary Examiner—Lenard A. Footland
Attorney, Agent, or Firm—Tarolli, Sundheim & Covell

[57] ABSTRACT

An apparatus is provided to rotatably support a shaft having an annular worn portion and unworn portions disposed adjacent to axially opposite ends of the worn portion. The apparatus includes a plurality of bearing elements. The bearing elements engage the unworn portion of the shaft at a location adjacent to the worn portion of the shaft. A sleeve encloses the bearing elements and the worn portion of the shaft. Opposite ends of the sleeve are closed by seals which engage unworn portions of the shaft.

8 Claims, 3 Drawing Figures

BEARING AND METHOD FOR ROTATABLY SUPPORTING A WORN SHAFT

BACKGROUND OF THE INVENTION

1. Field of the Invention

The present invention relates to bearings. More particularly, the present invention relates to a replacement bearing for use with a worn shaft.

2. Description of the Prior Art

As initially installed, an axle shaft is rotatably supported by a bearing assembly which engages a portion of the shaft. As the shaft rotates during use, rolling contact with the bearing assembly causes a portion of the shaft to wear away. The worn portion of the shaft, which is engaged by the bearing assembly, typically appears as an annular groove in the shaft.

The worn portion of the shaft has a diameter smaller than the diameter of an unworn portion of the shaft adjacent to the worn portion. Thus, a radial clearance exists between the bearing assembly and the worn portion of the shaft. The radial clearance results in undesirable operating characteristics.

Corrective measures during servicing have previously included replacing the entire shaft or having the worn portion of the shaft repaired. Repair of the shaft involves building up material in the worn portion and then grinding the material to a desired diameter. Both of these known corrective measures are costly and time-consuming.

SUMMARY OF THE INVENTION

The present invention provides a method and apparatus for rotatably supporting a shaft having a worn portion. The present invention enables the worn shaft to be used without replacing the shaft or repairing the worn portion of the shaft. This is accomplished by a bearing assembly which engages an unworn portion adjacent to the worn portion of the shaft.

In a preferred embodiment of the present invention, the bearing assembly includes bearing elements which rotatably support the worn shaft at a location adjacent to a first axial end of the worn portion of the shaft. The bearing assembly also includes a sleeve which encloses both the bearing elements and the worn portion of the shaft. A first seal is connected with a first end portion of the sleeve and engages an unworn portion of the shaft adjacent to the bearing elements. A second seal is connected with a second end portion of the sleeve and engages an unworn portion of the shaft adjacent to the worn portion.

BRIEF DESCRIPTION OF THE DRAWINGS

Further features of the present invention will become apparent from a reading of the following specification made with reference to the accompanying drawings, in which.

DESCRIPTION OF A PREFERRED EMBODIMENT

Figure 1:
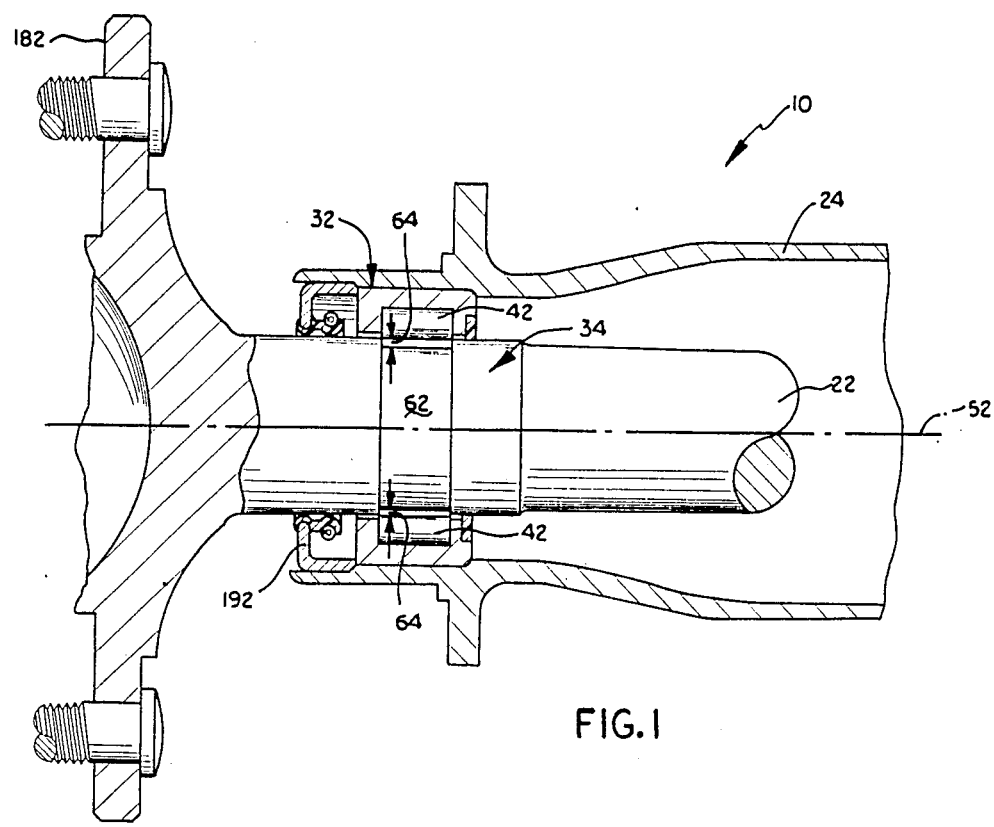
FIG. 1 is a view, partly in section, of a shaft having a worn portion and a known bearing assembly which rotatably supports the shaft.

An outer end portion of a known axle assembly 10 is illustrated in FIG. 1. While an automotive axle assembly 10 is illustrated for purposes of example, it will be apparent to those skilled in the art that the present invention may be utilized in many different environments.

The axle assembly 10 includes an axle shaft 22, an axle shaft housing 24, and a known bearing assembly 32. The axle shaft 22 transmits a drive force to the drive wheels (not shown) of the vehicle in which the axle assembly 10 is installed. The bearing assembly 32 supports the axle shaft 22 for rotation in the axle shaft housing 24. The bearing assembly 32 engages the axle shaft 22 at a generally cylindrical portion 34 of the axle shaft.

The known bearing assembly 32 includes a plurality of roller elements 42. The roller elements 42 are made from steel and generally have a surface hardness greater than the surface hardness of the cylindrical portion 34 of the metal axle shaft 22. The roller elements 42 roll over the cylindrical portion 34 of the axle shaft 22 during rotation of the axle shaft. After a period of time, or under severe operating conditions, the portion of the axle shaft 22 engaged by the roller elements 42 wears due to the rolling contact. A worn portion 62 of the axle shaft 22 results from the contact and appears as an annular groove in the cylindrical portion 34 of the axle shaft 22.

A radial clearance 64 exists between the bearing assembly 32 and the worn portion 62 of the axle shaft 22. This radial clearance 64 permits movement of the axle shaft 22 relative to the bearing assembly 32 in a direction transverse to the longitudinal axis 52 of the axle shaft. As is known, this movement is an undesirable condition and requires servicing to correct. Typically, previously known servicing of the worn axle shaft 22 involves completely replacing the worn axle shaft with a new, unworn axle shaft or repairing the worn portion of the axle shaft. Either of these previously known servicing alternatives are costly and time consuming.

Figure 2:
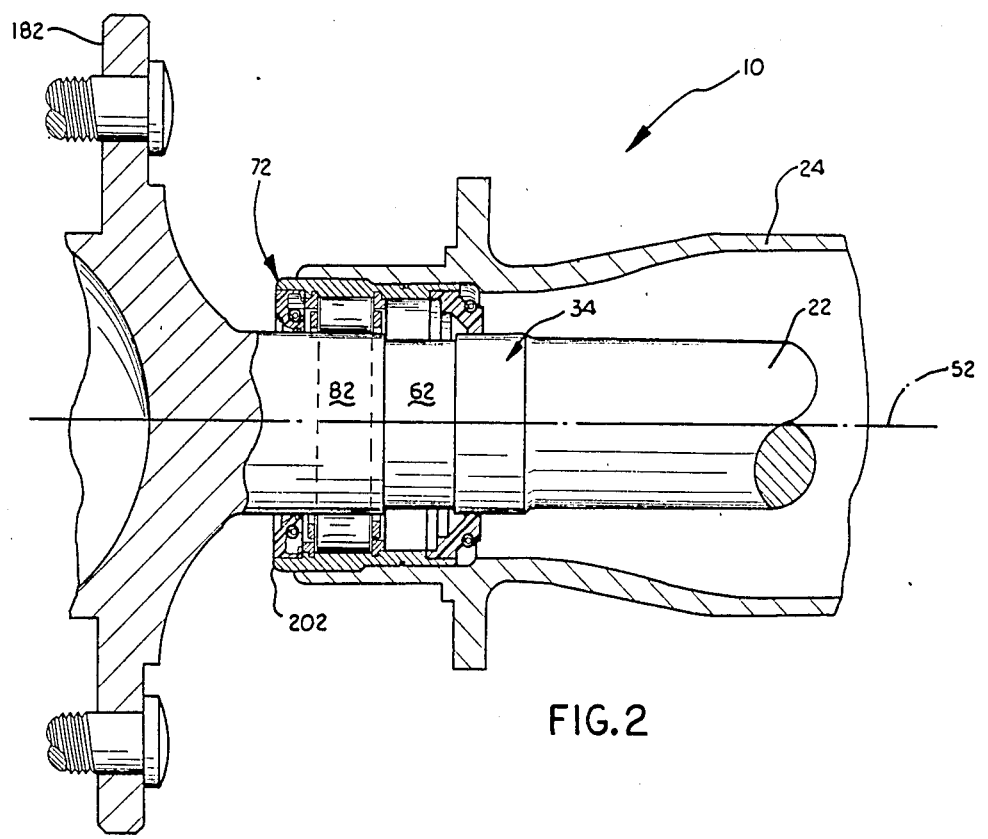
FIG. 2 is a view, similar to FIG. 1, of a bearing assembly constructed in accordance with the present invention rotatably supporting the worn shaft.

In FIG. 2 a bearing assembly 72, made in accordance with the present invention, is illustrated supporting the worn axle shaft 22 for rotation in the housing 24. The bearing assembly 72 of the present invention engages an unworn portion 82 of the axle shaft 22 adjacent to the worn portion 62. Use of the bearing assembly 72 permits the old, worn axle shaft 22 to be reused without the cost disadvantages of replacing or repairing the worn axle shaft. Use of the bearing assembly 72 also eliminates the undesirable transverse movement of the axle shaft 22 due to the radial clearance.

Figure 3:
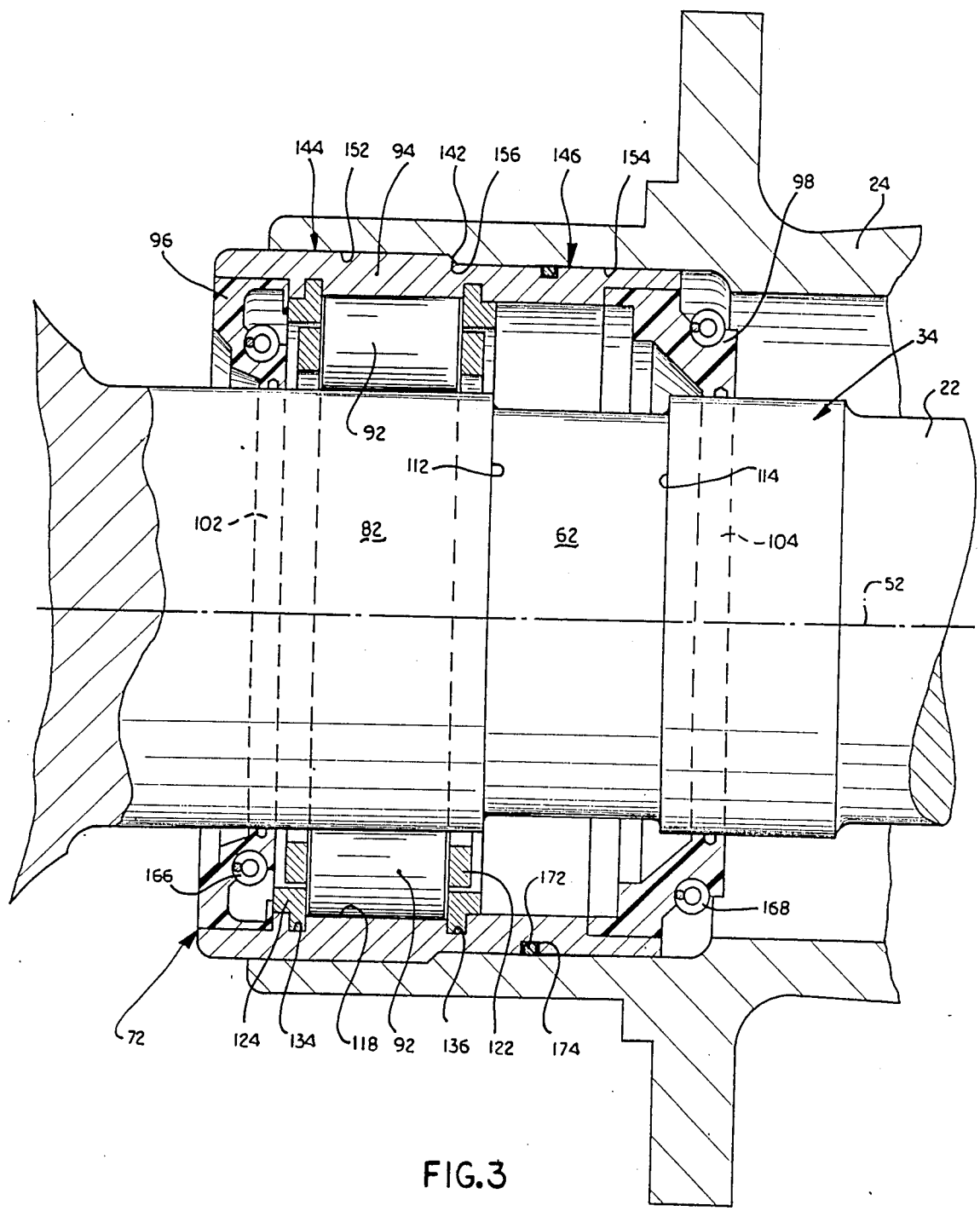
FIG. 3 is an enlarged view of the bearing assembly of FIG. 2.

The bearing assembly 72 (FIG. 3) includes a plurality of roller bearing elements 92, a sleeve 94, and seals 96, 98. The roller bearing elements 92 engage the unworn portion 82 of the axle shaft 22 which is adjacent an axial end 112 of the worn portion 62. It will be apparent that the bearing assembly could be modified in order to engage an unworn portion of the axle shaft 22 adjacent to an axial end 114 of the worn portion 62. The bearing elements 92 also engage an inner surface portion 118 of the sleeve 94.

Each of the roller bearing elements 92 has a cylindrical configuration. The dimensions of the inner surface portion 118 of the sleeve 94 and of the roller bearing elements 92 are selected so that the roller bearing elements engage both unworn portion 82 of the axle shaft 22 and the inner surface portion of the sleeve. This causes the roller bearing elements to rotate about their individual axes and revolve about the longitudinal axis 52 of the axle shaft 32, as is known. It will be apparent that bearing elements having a different configuration, such as spherical, could be used.

The roller bearing elements 92 are spaced circumferentially about the inner surface portion 118 of the sleeve 94. The roller bearing elements 92 are maintained in the circumferentially spaced relationship within the sleeve 94 by a cage 122, as is known. The cage 122 prevents the roller bearing elements 92 from engaging one another during rotation of the axle shaft 22. The roller bearing elements 92 are also prevented from axial movement relative to the sleeve 94 by a pair of expandable rings or circlips 124, 126. Each of the circlips 124, 126 resiliently expands into a respective annular groove 134, 136 in the inner surface portion 118 of the sleeve 94. Thus, the axial position of the roller bearing elements 92 is maintained in a predetermined axial position relative to the sleeve 94.

The sleeve 94 encloses the roller bearing elements 92 and the worn portion 62 of the axle shaft 22. The sleeve 94 of the bearing assembly 72 is of a generally cylindrical configuration and includes an annular external shoulder portion 142 separating the sleeve into two axial end portions 144, 146 (FIG. 3) of different outer diameters. The outer diameter of the cylindrical end portion 144 is selected so a slight interference fit results between it and a machined inner surface portion 152 of the axle shaft housing 24 when the bearing assembly 72 is installed in the axle shaft housing.

The outer diameter of the end portion 146 is sized so no interference results between it and another machined inner surface portion 154 of the axle shaft housing 24 when the bearing assembly 72 is installed. The shoulder portion 142 of the sleeve 94 engages a shoulder portion 156 of the axle shaft housing 24 when the bearing assembly 72 is axially inserted into the open end of the axle shaft housing 24. The engagement of the shoulder portions 142 and 156 establishes the axial position of the bearing assembly 72 in the axle shaft housing 24. The relative axial position of the roller bearing elements 92 relative to the sleeve 94, combined with the sleeve being positioned within the axle shaft housing 24 at a predetermined axial location, establishes the axial position that the roller bearing elements engage the unworn portion 82 of the axle shaft 22.

The seals 96, 98 are connected with axially opposite end portions of the sleeve 94 and sealing engage unworn portions 102, 104, respectively, of the axle shaft 22. The first seal 96 is mounted in the sleeve at an end portion located axially outward of the roller bearing elements 92 and spaced from the axial end 112 of the worn portion 62 by a distance which is at least as great as the axial extent of the roller bearing elements and cage 122. The first seal 96 sealingly engages a circumferential portion 102 of the axle shaft 22 in order to prevent contaminants from entering the bearing assembly 72 from outside of the axle shaft housing 24. The first seal 96 is of known design and is made from a known elastomeric material. A spring 166 exerts a force radially inwardly on the first seal 96 to maintain the sealing engagement with the circumferential portion 102 of the axle shaft 22.

The second seal 98 is mounted in the sleeve 94 at an end portion located axially opposite of the first seal 96. The circular second seal 98 engages the unworn portion 104 of the axle shaft which is disposed adjacent to the axial end 114 of the worn portion 62. The second seal 98 prevents contaminants from within the axle shaft housing 24 from entering the bearing assembly 72. The second seal 98 is made from a known elastomeric material. A spring 168 exerts a force radially inwardly to maintain the seal 98 in engagement with the unworn portion 104 of the axle shaft 22. Thus, the bearing assembly 72 is sealed from contaminants.

The roller bearing elements 92 and sleeve 94 are packed with a lubricant sufficient to withstand the operating loads and temperatures experienced during operation. Such a lubricant may be a high temperature white lithium grease, as is known. The seals 96 and 98 keep the lubricant in the sleeve 94.

The bearing assembly 72 also includes a third seal 172 disposed in an annular groove 174 in an outer surface of the sleeve 94. The third seal 172 is compressed by engagement with the machined inner surface portion 154 of the axle shaft housing. The seal 134 prevents external contaminants from entering the axle shaft housing 24.

The following procedure is used when it is determined that the axle shaft 22 (FIG. 1) has a worn portion 62 and requires servicing. For ease of handling, any parts connected with the worn axle shaft 22 are removed. The axle shaft 22 is then removed from the axle shaft housing 24 by moving the axle shaft to the left, as viewed in FIG. 1. An outer seal 192 (FIG. 1) is removed from the axle shaft housing 24. The known bearing assembly 32 is then removed from the axle shaft housing 24.

The bearing assembly 72 (FIG. 2) made in accordance with the present invention, is inserted into the open end portion of the axle shaft housing 24 and moved to the right, as viewed in FIG. 2. A force must be applied to the end portion 202 of the bearing assembly 72 to overcome the interference fit between the sleeve 94 and the axle shaft housing 24. The bearing assembly 72 is moved to the right, as viewed in FIG. 2, until the shoulder portion 142 (FIG. 3) of the sleeve engages the shoulder portion 156 of the axle shaft housing 24.

The axle shaft 22 is then inserted into the bearing assembly 72 and is moved axially to the right, as viewed in FIG. 2. When the desired position of the axle shaft 22 (illustrated in FIG. 2) is reached, the bearing elements 92 (FIG. 3) engage the unworn portion 82 and the seals 96, 98 sealingly engage the respective unworn portions 102, 104. The third seal 172 engages the axle shaft housing 24 to prevent fluid loss from the axle shaft housing or contaminants from entering the axle shaft housing. The worn portion 62 of the axle shaft 22 is not engaged by the roller bearing elements or the seals 96, 98. The roller bearing elements 92 engage only the unworn portion 82 of the axle shaft 22 and support the axle shaft for rotation about the axis 52 relative to the axle shaft housing 24. The axle assembly 10 can then be placed back into service without the cost or time delay disadvantages of replacing or repairing the axle shaft 22 having the worn portion 62.

From the above description of a preferred embodiment of the invention, those skilled in the art will perceive improvements, changes and modifications. Such improvements, changes and modifications within the skill of the art are intended to be covered by the appended claims.

Having described a preferred embodiment, the following is claimed:

1. An apparatus for use in rotatably supporting a shaft having an annular worn portion and unworn portions disposed adjacent to axially opposite ends of the worn portion, said apparatus comprising:

bearing means for engaging the unworn portion of the shaft at a location adjacent to a first axial end of the worn portion of the shaft;

sleeve means for enclosing said bearing means and the worn portion of the shaft;

first seal means connected with a first end portion of said sleeve means for engaging an unworn portion of the shaft adjacent to said bearing means and at a location spaced from the worn portion of the shaft by an axial distance which is at least as great as the axial extent of engagement of said bearing means with the unworn portion of the shaft; and second seal means connected with a second end portion of said sleeve means for engaging an unworn portion of the shaft adjacent to a second axial end of the worn portion of the shaft.

2. An apparatus as set forth in claim 1 wherein said bearing means includes a plurality of rotatable bearing elements enclosed by said sleeve means.

3. An apparatus as set forth in claim 2 wherein said sleeve means includes a tubular sleeve having an annular external shoulder for engaging an annular internal shoulder of a shaft housing to establish the position of said tubular sleeve relative to the shaft housing.

4. An apparatus as set forth in claim 3 wherein said tubular sleeve further includes means for maintaining said plurality of bearing elements in a predetermined axial location relative to said tubular sleeve.

5. An apparatus as set forth in claim 4 wherein said means for maintaining said plurality of bearing elements in a predetermined axial location includes said tubular sleeve having a pair of axially spaced annular grooves in an inner surface of said tubular sleeve and a pair of circumferentially expandable rings, each of said pair of circumferentially expandable rings adapted to be disposed in a respective one of said grooves for retaining said plurality of bearing elements therebetween.

6. An apparatus as set forth in claim 3 wherein said tubular sleeve includes means for sealingly engaging the shaft housing.

7. An apparatus as set forth in claim 2 further including cage means for retaining said plurality of bearing elements in a circumferentially spaced relationship.

8. An apparatus as set forth in claim 2 wherein each of said plurality of bearing elements is of a cylindrical configuration.

* * * * *